July 9, 1935.    A. HELGASON    2,007,681
TRANSFORMER CASING
Filed Feb. 2, 1935

INVENTOR
ARNI HELGASON
BY Robert L. Kahn
ATTORNEY

Patented July 9, 1935

2,007,681

UNITED STATES PATENT OFFICE 2,007,681

TRANSFORMER CASING

Arni Helgason, Wilmette, Ill., assignor to Chicago Transformer Corporation, Chicago, Ill.

Application February 2, 1935, Serial No. 4,617

3 Claims. (Cl. 175—361)

This invention relates to transformer casings and particularly to the end casings of small transformers such as are used in radios and household devices. The end casings of small transformers generally are blanked out in duplicate and cut across the middle to provide two casings. Each casing comprises a frame with the central portion bulged out to the bottom edge to encase the transformer windings. Such casings, however, are open at the bottom and do not give the transformer the desired protection. To close the bottom of the casing in a simple and a cheap manner is the primary object of this invention.

Figure 1:
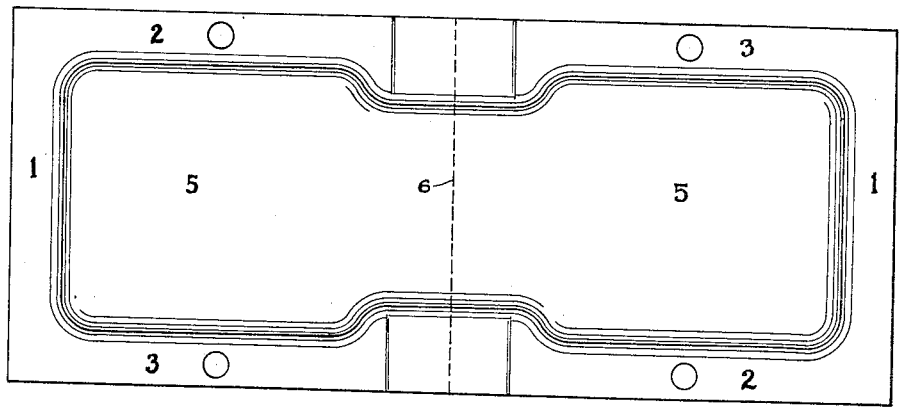
Figure 2:
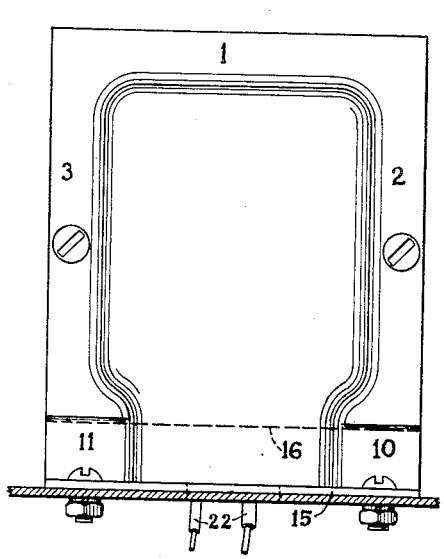
Figure 3:
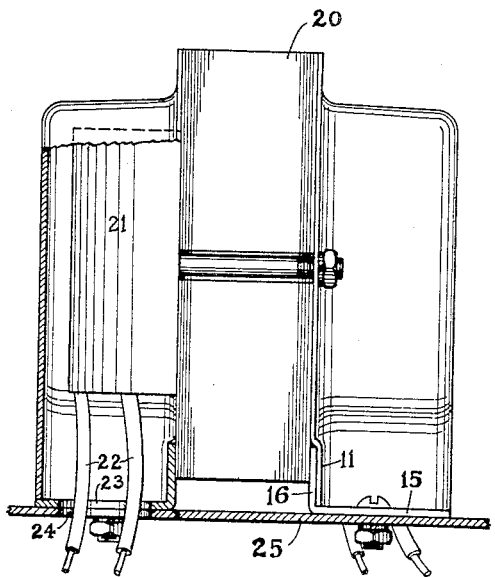

Referring to the drawing, Figure 1 is a view of two casings, pressed out as a unit; Figure 2 is a front view of a transformer with a casing. Figure 3 is a side view thereof partly in section.

The casing comprises a metal member, having a top rim 1 and side rims 2 and 3. The interior region 5 of the member is bulged out and extends to the bottom 6 of the casing. Such casings, as have been previously pointed out, are usually blanked out in duplicate and cut across the bottom end 6 thereof.

To close the bottom of the casing, there are provided offset portions 10 and 11 of rims 2 and 3, the offset being about equal to the thickness of the metal. An angle piece 15 having a vertical portion 16 is disposed across the bottom of the casing in the manner shown and spot welded at portions 10 and 11. Vertical portion 16 forms a flange which is in the plane of rims 1, 2 and 3 of the casing. Suitable holes may be provided in rims 2 and 3 and angle piece 15 as shown for bolts. This construction lends itself to a simple assembly of the transformer, while the vertical portion 16 rigidly holds the bottom of the transformer laminations 20 together and prevents the possibility of hum. The winding 21 may have a plurality of leads 22 brought out through a suitable aperture 23 in angle piece 15 and an aperture 24 in base 25 to which the transformer is bolted.

What is claimed is:

1. An end casing for transformers and the like comprising a generally rectangular metallic member having rims along three sides thereof with the central portion thereof bulged out to the fourth side, the rims adjacent the fourth side being offset for a portion of the length thereof in the same direction as the bulge, the remainder of the two rims and the third rim lying in one plane, and an angle piece having its sides at right angles to each other disposed so that one portion thereof forms a fourth rim and the other portion thereof closes the open region formed by the bulge at the fourth side, said one portion lying over the offset portions and being thick enough so that the fourth rim thus formed is in the same plane as the other three rims and means for permanently uniting said member and angle piece.

2. The structure of claim 1 wherein said angle piece is spotwelded to said member at the offset regions thereof.

3. In combination a transformer comprising windings and a core, said core surrounding said windings and having a flat region around said windings on each side of said core, and a pair of end casings as defined in claim 1 therefor, each casing being disposed on one side of said core to enclose said windings there between with the rims of said casings abutting against the flat regions on said core.

ARNI HELGASON.